(No Model.)

C. D. TISDALE.
AUTOMATIC ELECTRIC FIRE ALARM.

No. 546,262. Patented Sept. 10, 1895.

WITNESSES
F. B. Wentworth
E. B. Hall

INVENTOR
Charles D. Tisdale.
On Edwin W. Brown.
Attorney.

UNITED STATES PATENT OFFICE.

CHARLES D. TISDALE, OF BOSTON, MASSACHUSETTS, ASSIGNOR, BY DIRECT AND MESNE ASSIGNMENTS, OF TWO-THIRDS TO JOHN D. GOULD, OF BROOKLYN, AND CHARLES A. HANSON, OF NEW YORK, N. Y.

AUTOMATIC ELECTRIC FIRE-ALARM.

SPECIFICATION forming part of Letters Patent No. 546,262, dated September 10, 1895.

Application filed March 25, 1895. Serial No. 543,141. (No model.)

*To all whom it may concern:*

Be it known that I, CHARLES D. TISDALE, of Boston, in the county of Suffolk and State of Massachusetts, have invented certain new and useful Improvements in Automatic Electric Fire-Alarms, of which the following is a full, clear, and exact description.

The object of the present invention is to provide a simple, cheap, and efficient electrical fire-alarm system for use more particularly in apartment houses, dwellings, buildings, &c., although applicable as well to stores, warehouses, factories, &c.; and the invention consists, in combination with a room or other apartment or place or building, &c., of a wire made of any suitable fusible material that will fuse at the desired degree of heat, which is located and run around a room or building, &c., as desired, an electric circuit, and a sounding device all constructed and arranged for operation, substantially as hereinafter described; and the invention also consists in combination with a room or other apartment or place or building, &c., of a wire made of any suitable fusible material that will fuse at the desired degree of heat which is located and run around a room or building, &c., as desired, an electric circuit, an electric motor, and an incandescent lamp, all constructed and arranged for operation, all substantially as hereinafter fully described; and the invention also consists in combination with a room or other apartment or place or building, &c., of a wire made of any suitable fusible material that will fuse at the desired degree of heat, which is located and run around a room or building, &c., as desired, an electric circuit, a sounding device, an electric motor, and incandescent lamp, all constructed and arranged for operation, substantially as hereinafter fully described, reference being had to the accompanying sheet of drawings, in which is illustrated the present invention.

Figure 1:
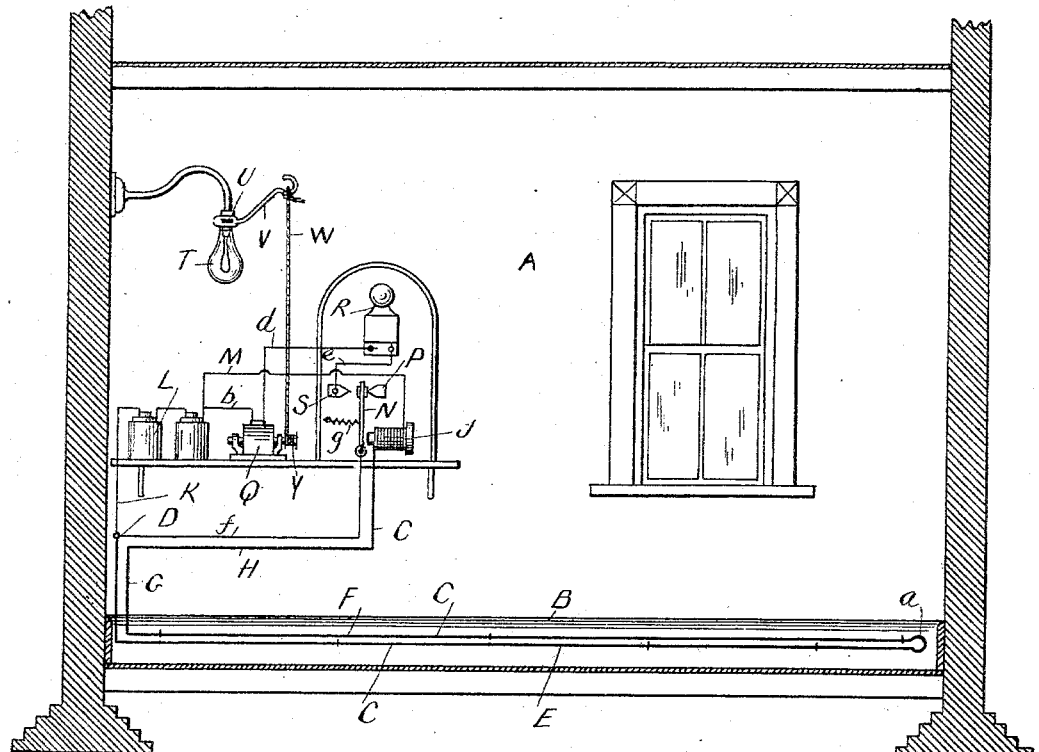
Figure 2:
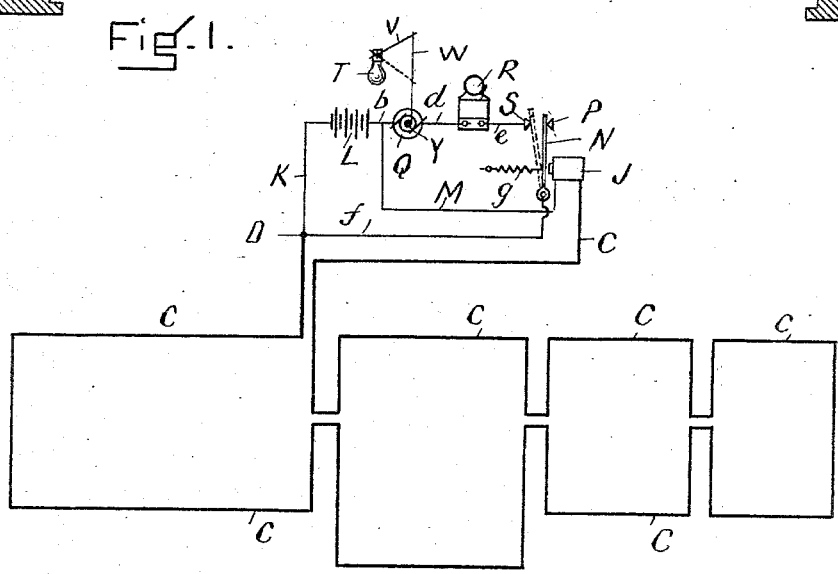

Figure 1 represents the side of a room with the invention applied thereto. Fig. 2 is a diagram representing the fusible wire extending around as if in a series of rooms or building and the manner of making the electric circuit.

In the drawings, A represents the side wall of a room, and B its mop-board.

C is a wire, which is made of metal, and one that will fuse at any desired heat. As shown, this wire extends from a point D on the wall down and then along the mop-board at E, having a return bend at $a$, and then runs along the mopboard at F above its other portion E, thence upward at G and to the right at H and upward to and is electrically connected with one pole of a magnet J secured to the wall. This fusible wire, with the magnet, is in an electric circuit made by a wire K from the terminal D with one pole of an electric battery L and from the other pole of the battery by a wire M with the electromagnet J, which makes the circuit complete through the fusible wire back to the front D, closing the same, which attracts the armature N and moves it toward itself, but to rest and bear upon an insulated block P, which is located so the armature will be just free of and not touch the magnet.

Another electric circuit is made as follows: From the battery a wire $b$ runs to and connects with an electromotor Q, from thence a wire $d$ connects with a bell R, and from the bell another wire $e$ connects with a block or terminal S. Another wire $f$ connects at the point D of the fusible wire and runs from thence to and connects with the armature N.

T is an incandescent lamp, and its thumb-piece U has a crank-arm V attached to it, which at its end is connected by a cord W with the shaft Y of the electromotor, so that if the motor is operated its shaft as it turns will wind upon it, the cord pulling down the crank-arm V and cause the thumb-piece to turn sufficiently to turn on the electric current in connection therewith and light the lamp.

In practical use the fusible wire C can be run round the room at any and all places desired, along the mop-board, up at the sides, along the ceiling, cornices, &c., but should be of one continuous length, or at least so the electric current will flow through its whole length.

The electric apparatus, the bell, and lamp can be placed in another room or in any part of the building, or the bell and lamp could be placed outside of the building, as desired, but the electric wire should connect with the fusible wire, as at D, and the fusible wire with the magnet, or if the magnet was located in another room an electric wire could connect the two.

With an electrical fire-alarm device arranged for operation as described and shown, if a fire occurs in any part of the room wherever the fusible wire is located, the wire at such place becomes heated and soon melts and runs down, breaking or separating at such place, breaking the electric circuit, demagnetizing the magnet, which releases the armature, when instantly the spring $g$, connected to the armature N, pulls it away from contact with the insulated point P over to and in contact with the terminal S, which then makes the electric circuit through battery, motor, bell, and armature, as described. That instant the electric motor is operated which winds up the cord, and turning the thumb-piece $u$ of the incandescent lamp it becomes lighted and the bell is caused to sound, giving an alarm by light and sound, which continues until some one comes to shut off the current or the battery runs down. The fusible wire can be of any size, preferably quite small, and it can be of a metal or compound to fuse at any desired or very low degree of heat. It can extend around the room, along the mop-board, in one of its grooves, or at any desired place and height in the room along the sides of the room or in the corners, into closets, &c., and being small wire, as is evident, it can be laid easily and conveniently in most all places about the room or building, it being necessary, however, to keep the fusible wire electrically continuous and have its two ends connected with the electrical circuit to be complete at all times through the fusible wire, so that when the fusible wire is broken the electric circuit will be broken and the bell sounded, as described.

The bell and battery can be located in any place in or out of the building or outside of the room or on the outside of the building, and in some cases it might be well to have the electric lamp outside of the building, so that on the sounding of the bell calling attention to it any person on the street could quickly tell which building it was by the light, which in such cases should preferably have a red glass globe.

The great advantage of this system of electric fire-alarm is that the fusible wire can extend around the room or building indefinitely and into all places connected therewith, making what may be called a "continuous fusible electric circuit," so that the instant a flame or extreme and dangerous heat touches or warms up any part of the continuous wire, it will melt it, and breaking or separating it at such place, break the electric circuit in connection therewith, which electric circuit is then made through the bell sounding the same, and if the motor and electric lamp are in the circuit causing the electric motor to turn on the electricity to light the lamp, which continues to sound and the light to burn, respectively, until some one comes to look after the fire, &c.

The bell or sounding device can be used alone without the electric lamp in a great many places; also the lamp can be used without the bell, and sometimes the two can be used in combination. This extensive use and arrangement of the fusible wire in a room or other place insures that an alarm will be given immediately at the start of the fire, and at all places in the room or building before it is spread or becomes dangerous or of any magnitude, as is obvious and is very important. As this fusible wire can be made at a very small cost it makes a very cheap device, and also being so cheap is very effectual in that plenty of the wire can be used at a small cost, and thus every place, corner, &c., in the room or building be protected by it.

Having thus described my invention, what I claim is—

1. In an electric fire alarm, the combination with an electric motor, electric battery and electric magnet, of a continuous wire C of uniformly fusible material connected at one end to said magnet, a wire K connecting one end of said fusible wire to one pole of the battery, a wire M connecting said magnet with the other pole of the battery, a wire $b$ from the battery to the motor, a sounding device, a wire $d$ connecting said sounding device to the motor, a terminal or block S, and a wire $e$ running from said sounding device to said block, substantially as described.

2. In an electric fire alarm, the combination with an electric motor, electric battery and electric magnet, of a continuous wire C of uniformly fusible material connected at one end to said magnet, a wire K connecting one end of said fusible wire to one pole of the battery, a wire M connecting said magnet with the other pole of the battery, a wire $b$ from the battery to the motor, a sounding device, a wire $d$ connecting said sounding device to the motor, a terminal or block S, a wire $e$ running from said sounding device to said block, an incandescent lamp provided with a crank arm V, and a cord W connecting said crank arm with the shaft Y of the motor, substantially as described.

In testimony whereof I have hereunto set my hand in the presence of two subscribing witnesses.

CHARLES D. TISDALE.

Witnesses:
EDWIN W. BROWN,
F. B. WENTWORTH.